United States Patent [19]

Reid

[11] Patent Number: 4,692,380
[45] Date of Patent: * Sep. 8, 1987

[54] METALLIZABLE POLYPROPYLENE FILM

[75] Inventor: Donald E. Reid, Landenberg, Pa.

[73] Assignee: Hercules Incorporated, Wilmington, Del.

[*] Notice: The portion of the term of this patent subsequent to Aug. 5, 2003 has been disclaimed.

[21] Appl. No.: 854,202

[22] Filed: Apr. 21, 1986

Related U.S. Application Data

[62] Division of Ser. No. 762,905, Aug. 6, 1985, Pat. No. 4,604,322.

[51] Int. Cl.$^4$ .................. B32B 15/08; B32B 15/20
[52] U.S. Cl. .................. 428/349; 427/39; 428/461; 428/500; 428/515
[58] Field of Search .................. 428/349, 46.1, 500, 428/515; 427/39, 250

[56] References Cited

U.S. PATENT DOCUMENTS

| | | | |
|---|---|---|---|
| 4,294,882 | 10/1981 | Andrews et al. | 428/349 |
| 4,345,005 | 8/1982 | All et al. | 428/515 |
| 4,508,786 | 4/1985 | Ishibashi et al. | 427/250 |
| 4,559,266 | 12/1985 | Misasa et al. | 428/461 |
| 4,599,275 | 7/1986 | Hayashi et al. | 428/461 |
| 4,604,322 | 8/1986 | Reid | 428/461 |

Primary Examiner—Paul J. Thibodeau
Attorney, Agent, or Firm—William S. Alexander

[57] ABSTRACT

This invention relates to the metallized, biaxially oriented polypropylene films which exhibit good adhesion between the polypropylene and the metal coating, but which, at the same time, have surface properties whereby they are readily machine handleable for processing.

7 Claims, No Drawings

METALLIZABLE POLYPROPYLENE FILM

This application ia a division of application Ser. No. 762,905 filed Aug. 6, 1985 now U.S. Pat. No. 4,604,322.

BACKGROUND OF THE INVENTION

It has been standard practice for many years to use a slip agent to reduce the coefficient of friction (COF) of the surface of polypropylene films. By this means, blocking of adjacent layers of film on mill rolls is prevented and the film can readily be unwound for use or for further processing. In the absence of the slip agent, the layer-to-layer COF is so great that smooth unwinding of the film is virtually impossible. Typical slip or antiblock agents are the higher molecular weight fatty acid amides such as stearamide or oleamide. It has become standard practice in the art to incorporate about 0.1 to 1%, preferably 0.2 to 0.5% by weight of such compounds into polyolefin films as slip agents.

In another aspect of the polyolefin film business, there is a rapidly growing market for films carrying a metal coating on one or both surfaces, either for functional or aesthetic reasons.

The films employed for this purpose are usually composites consisting of a polypropylene core layer having, on at least one of its surfaces, a relatively thin layer of a propylene--ethylene copolymer. This copolymer layer is subjected to a corona discharge treatment and the coating metal is then deposited by such methods as electroplating, sputtering or vacuum metallizing. Here, however, the problem is encountered that the presence of conventional concentrations of slip agent in the film destroys the adhesion of the metal coating to the film. In consideration of this problem, it has been proposed to prepare metallizable films by removing the slip agent from the film completely. Such films have, however, not been particularly popular on a commercial scale due to the high COF of the film surfaces and resultant blocking of the film upon unwinding due to the lack of slip agent.

It is the purpose of this invention to provide a metallizable polypropylene film which is not subject to the problems set forth hereinabove.

BRIEF STATEMENT OF THE INVENTION

In accordance with this invention, there is provided a metallizable polypropylene film comprising a polypropylene core layer, said core layer having, incorporated therein, about 0.03 to about 0.15% by weight of a fatty acid amide containing from about 16 to about 22 carbon atoms, and, on at least one surface of said core layer, a 2 to 20 gauge layer of propylene--ethylene copolymer which contains no slip agent and which has been subjected to corona discharge treatment to enhance its metal adhesion characteristics.

DETAILED DESCRIPTION OF THE INVENTION

The polypropylene core layer is preferably homopolymer, although copolymers of propylene with minor amounts of ethylene or an α-olefin can also be used. Typical commercially available film-forming propylene homopolymers are crystalline or isotactic in their molecular structure and have a melt flow rate of about 2 to 10 dg/min. The polypropylene is compounded with conventional additives such as antioxidants, light stabilizers and inorganic antacids such as calcium oxide or magnesium aluminum hydroxide carbonate hydrate in addition to the fatty acid amide slip agent.

The fatty acid amide slip agent is also a conventional polypropylene additive, but it is used in a critical, non-conventional concentration. In conventional prior art practice, the slip agent is employed in concentrations of about 0.12 to about 0.5%. In accordance with this invention, the slip agent concentration is about 0.03 to about 0.15% by weight, based on polypropylene. Preferably the slip agent concentration is between 0.05 and 0.1%.

The fatty acid amide slip agent can be any long chain fatty acid amide having about 16 to 22 carbon atoms. Preferred are erucamide, behenamide, oleamide and stearamide.

At least one surface of the polypropylene core layer carries a layer of a propylene--ethylene copolymer which copolymer contains about 1 to 10% by weight of ethylene. The preferred copolymer contains about 3 to 7% by weight of ethylene as determined by infrared spectroscopy. These copolymers are much more receptive to corona discharge treatment and more adherent to the subsequently applied metal coating than is propylene homopolymer per se. No slip agent is incorporated into this layer of the composite film. Absence of slip agent, in conjunction with the greatly reduced level of slip agent in the core, creates a situation where the amount of the amide that blooms to the surface of the copolymer is not sufficient to destroy the adhesion of the metal coating, but the amount that blooms to the other surface of the polypropylene core is sufficient to provide a commercially acceptable degree of antiblock characteristics.

The other surface of the polypropylene core layer can be uncoated, or if heat sealability is required, it can carry a coating of heat sealable copolymer. In this latter event, the copolymer can, but need not be, the same copolymer as that employed on the side intended to be metallized, as the specified copolymer makes an excellent heat seal layer. Other useful heat sealable coating layers include low density polyethylene, ethylene-α-olefin copolymers such as ethylene-butene or ethylene--octene copolymers and ethylene-propylene-butene terpolymer.

The composite films, according to the invention, can be prepared by extrusion coating, coextrusion or lamination. Coextrusion is a preferred technique as it enables one to apply an extremely thin layer most efficiently. For best results, the coatings either on the metallizable side or the heat seal side should be between about 3 and 15 gauge in thickness and more preferably between about 4 and 8 gauge.

To attain good adhesion of the metallizing film to the copolymer, the surface of the copolymer layer must be subjected to a corona discharge treatment. This is a conventional treatment and is carried out in a known manner to a dyne value of about 36 to 60 dynes/cm and preferably about 40 to 50 dynes/cm. Only the surface of the film to which the metal coating is to be coated is subjected to the corona discharge treatment.

The metal coating can be applied to the corona-treated copolymer layer by any known method such as sputtering, vacuum deposition or electroplating. Vacuum deposition is a preferred method. The most frequently used coating metal is aluminum, although other metals such as gold, silver and copper are also employed on occasion.

EXAMPLE 1

A base film 27 mils thick and composed of 100 parts polypropylene, 0.10 part hindered phenolic antioxidant, 0.05 part of magnesium aluminum hydroxide carbonate hydrate antacid, 5.5 parts of o-methyl styrene--vinyl toluene copolymer and 0.06 part of erucamide is extruded and cast on a roll. The resultant cast sheet is coated on one side with a 2 mil layer of a random propylene--ethylene copolymer containing 3.5 wt. % ethylene and on the other side with a 4 mil layer of a random propylene--ethylene copolymer containing 4.25 wt. % ethylene. This two-side coated sheet was then oriented 5 times in the machine direction and 9 times in the transverse direction on a tenter. The maximum web temperature during orientation was 156° C. After orientation, the film was heat set and corona treated on the metallizable side (the 3.5% ethylene copolymer side) to a dyne value of 40 dynes/cm. After metallization of the corona-treated surface, the resultant film showed excellent metal adhesion (0% metal lift with #610 Scotch ® tape) and adhesion after thermal lamination to the polyethylene side of a polyethylene/adhesive/polypropylene composite film. The brightness and clarity of the metallized surface was outstanding, and this metallized film showed no tendency to block (sealable side to metal surface) during further processing operations.

EXAMPLES 2 to 7

These compositions show the change in film properties as the concentration of erucamide is increased in the base film. A 17 mil cast sheet of the base films shown in the table was first coated at 480° F. with 2.4 mil of a 1/1 mixture of the 3.5% ethylene copolymer used in Example 1 and a second such copolymer containing 0.2 wt. % of a 3 micron silica material as an antiblock agent. The resultant coating is an ethylene-propylene copolymer containing 3.5 wt. % $C_2$ and 0.10 wt. % silica. The other side of the base casting was coated with 1.2 mils of the 3.5% ethylene copolymer mixture at 470° F. After biaxial orientation (6×6) at 145° C. with 10% heat set, the final film was composed of 8 gauge of sealable coating, 58 gauge of base film and 4 gauge of metallizable copolymer. The 4 gauge metallizable side was corona treated at 75° C. with a 3.0 watts/ft.$^2$/min. corona exposure and then heat soaked at 40° C. for 18 hours to simulate the normal plant processing and shipping time prior to metallization. The treated surface was then metallized with a 2 ohms/square coating of aluminum and evaluated as shown in Table 1.

In Table 1, the original and aged metal adhesion tests are conventional peel tests run on the metallized film using an Instron Tensile Tester wherein strength of the bond and the mode of failure are determined. Low values of the metal lift parameter indicate that the film-to-metal bond is stronger than the film.

To carry out the metal adhesion test, metallized film specimens, 3½ inches wide by 4½ inches long, one unaged and one aged for 5 minutes at 100° C., are used. These specimens are taped to a cutting board metal side up in such a way that no wrinkles are present on the film. Strips of Scotch 190 610 transparent tape are doubled back on themselves 1 inch to form a non-adherent tab on one end and applied to the metallized films to cover 3 inches of the 3½ inch width forming a 2 inch seal and leaving a 1 inch tab on both the film side and the tape side. The tape must be applied neatly so that no air is trapped beneath the tape and the tape is scraped three times with a blunt surface to assure good contact. Three peel (T-peel) test samples, 1 inch wide (i.e the width of the transparent tape) and 3½ inches long (i.e. the width of the metallized film specimen) are cut from each specimen and tested in a conventional T-peel test on the tensile tester. Test conditions: room temperature; 12 inches/min. crosshead speed; span 1 inch.

In the bond prediction test, the metallized film is heat laminated to a low density polyethylene-coated polypropylene film to simulate actual use where this step is common procedure. In some cases, the original metal-to-polymer bond can be damaged in this procedure which is carried out at a very high temperature. The peel strength and metal lift are then determined on this laminate using the tensile tester by conventional test methods.

The blocking parameter is measured by laying up the sealing surface of a film specimen against the metallizable surface of another film and placing the laid-up specimens between two metal plates in a jig. The plates are then subjected to 150 psi for 24 hours at 40° C., following which the force required to separate them in a standard T-peel test is determined using an Instron Tensile Tester.

TABLE 1

| Erucamide Content (phr) | 0 | 0.01 | 0.03 | 0.05 | 0.10 | 0.20 |
|---|---|---|---|---|---|---|
| Metal Adhesion | | | | | | |
| Original (g/in) Peak/Peel | 200/148 | 300/217 | 339/218 | 366/207 | 397/217 | 190/137 |
| Original, % Lift | 0 | 0 | 0 | 0 | 0 | 10 |
| Aged[1] (g/in) Peak/Peel | 183/158 | 511/248 | 391/248 | 322/208 | 316/193 | 178/142 |
| Aged, % Lift | 0 | 0 | 0 | 0 | 0 | 50 |
| Bond Prediction Test (g/in) Peak/Peel | 184/168 | 205/186 | 191/162 | 186/159 | 188/171 | 134/54 |
| Bond Prediction Test, % Lift | 20 | 30 | 25 | 40 | 25 | 70 |
| Blocking[2] (g/in) | 75 | 47 | 44 | 36 | 25 | 4 |
| COF[3] I/I | 0.55/0.50 | 0.55/0.49 | 0.57/0.58 | 0.40/0.39 | 0.21/0.19 | 0.18/0.17 |
| O/O | 0.67/0.57 | 0.73/0.69 | 0.62/0.54 | 0.59/0.57 | 0.47/0.43 | — |
| I/O | 0.58/0.57 | 0.61/0.63 | 0.55/0.55 | 0.46/0.48 | 0.26/0.26 | — |

[1]Aged 5 minutes at 100° C.
[2]Blocking after aging under 150 psi at 40° C. for 24 hours.
[3]I = Inside layer of film which is metallizable side. O = Outside or heat sealable layer.

What is claimed is:

1. A polypropylene film comprising a homopolypropylene core containing about 0.03 to 0.15% by weight based on the polymer of a fatty acid amide slip agent and having on one of its surfaces a 1 to 20 gauge layer comprised of a corona-treated propylene-ethylene copolymer containing about 1 to 10 wt. % ethylene and having no slip agent included therein and having a metal coating applied to said corona-treated layer.

2. A polypropylene film according to claim 1 wherein the slip agent is present in the amount of about 0.05 to 0.1%.

3. A polypropylene film according to claim 1 wherein the slip agent is erucamide.

4. A polypropylene film according to claim 3 wherein the erucamide is present in the amount of about 0.05 to 0.1%.

5. A polypropylene film according to claim 4 wherein the unmetallized surface carries a heat seal coating.

6. A polypropylene film according to claim 1 wherein the metal coating is aluminum.

7. A polypropylene film according to claim 5 wherein the metal coating is aluminum.

* * * * *